United States Patent
Avraham et al.

(10) Patent No.: US 12,326,805 B2
(45) Date of Patent: Jun. 10, 2025

(54) CALIBRATING STATE TRANSITION PROBABILITIES ASSOCIATED WITH A DNA-BASED STORAGE SYSTEM TO OPTIMIZE DECODING

(71) Applicant: Western Digital Technologies, Inc., San Jose, CA (US)

(72) Inventors: David Avraham, Even Yehuda (IL); Ran Zamir, Ramat Gan (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 19 days.

(21) Appl. No.: 18/356,123

(22) Filed: Jul. 20, 2023

(65) Prior Publication Data

US 2024/0176733 A1    May 30, 2024

Related U.S. Application Data (60) Provisional application No. 63/428,643, filed on Nov. 29, 2022.

(51) Int. Cl.
*G06F 12/00*   (2006.01)
*G06F 12/02*   (2006.01)
*G06N 3/123*   (2023.01)

(52) U.S. Cl.
CPC .......... *G06F 12/023* (2013.01); *G06N 3/123* (2013.01)

(58) Field of Classification Search
None
See application file for complete search history.

(56) References Cited

U.S. PATENT DOCUMENTS

| | | | |
|---|---|---|---|
| 10,020,826 B2 | 7/2018 | Gladwin et al. | |
| 10,554,227 B2 | 2/2020 | Sharon et al. | |
| 10,963,469 B2 | 3/2021 | Taig et al. | |
| 11,100,404 B2 | 8/2021 | Merriman et al. | |
| 2004/0081259 A1* | 4/2004 | Ammer | H03M 13/3905 375/340 |
| 2018/0253528 A1* | 9/2018 | Strauss | C12Q 1/6869 |
| 2020/0321079 A1 | 10/2020 | Huang et al. | |
| 2022/0042070 A1 | 2/2022 | Eppler et al. | |
| 2022/0237470 A1* | 7/2022 | Vishwakarma | G06F 3/067 |

OTHER PUBLICATIONS

P. Fei and Z. Wang, "LDPC Codes for Portable DNA Storage," 2019 IEEE International Symposium on Information Theory (ISIT), 2019, pp. 76-80, doi: 10.1109/ISIT.2019.8849814.
L. Deng et al., "Optimized Code Design for Constrained DNA Data Storage With Asymmetric Errors," in IEEE Access, vol. 7, pp. 84107-84121, 2019, doi: 10.1109/ACCESS.2019.2924827.

* cited by examiner

*Primary Examiner* — Daniel D Tsui
(74) *Attorney, Agent, or Firm* — Dentons Durham Jones Pinegar (57) ABSTRACT

A DNA-based storage system uses a set of initial state transition probabilities during a decoding process in which a DNA codeword is decoded. After a threshold number of decoding iterations of the decoding process have been executed, at least one initial state transition probability of the set of initial state transition probabilities is updated. The at least one initial state transition probability is updated based, at least in part, on information obtained during the threshold number of decoding iterations. When the at least one initial state transition probability is updated, the decoding process resumes and uses the updated at least one initial state transition probability.

20 Claims, 5 Drawing Sheets

| WRITTEN BASE/READ BASE | A | C | T | G |
|---|---|---|---|---|
| A | $1-2p_1-p_3$ | $p_1$ | $p_1$ | $p_3$ |
| C | $p_1$ | $1-2p_1-p_2$ | $p_2$ | $p_1$ |
| T | $p_1$ | $p_2$ | $1-2p_1-p_2$ | $p_1$ |
| G | $p_3$ | $p_1$ | $p_1$ | $1-2p_1-p_3$ |

CALIBRATING STATE TRANSITION PROBABILITIES ASSOCIATED WITH A DNA-BASED STORAGE SYSTEM TO OPTIMIZE DECODING

CROSS-REFERENCE TO RELATED APPLICATIONS

The present application claims priority to U.S. Provisional Application 63/428,643 entitled "CALIBRATING STATE TRANSITION PROBABILITIES ASSOCIATED WITH A DNA-BASED STORAGE SYSTEM TO OPTIMIZE DECODING", filed Nov. 29, 2022, the entire disclosure of which is hereby incorporated by reference in its entirety.

BACKGROUND

DNA-based storage systems are emerging as a promising storage technology. DNA is a long molecule made up of four nucleotide bases—adenine (A), cytosine (C), thymine (T) and guanine (G). For storage purposes, base units (ACTG) of synthesized DNA can be used to encode information—similar to how a string of ones and zeros represent data in traditional electronic storage systems. The encoded information may then be stored, subsequently accessed and decoded.

For example, DNA-based storage systems typically store DNA data using three main processes—synthesis (or writing) in which the base units of synthesized DNA are joined together to produce a desired DNA string; storage, in which the DNA string is stored in a DNA-based storage medium; and sequencing (or reading), in which the DNA string is translated to binary/digital data.

While DNA-based storage systems are more dense than traditional electronic data storage systems, DNA-based storage systems are more prone to errors. For example, during synthesis, storage and/or sequencing, various symbols in the DNA string may be inserted or deleted. In other examples, during synthesis, storage and/or sequencing, one symbol (or multiple symbols) in the DNA string may be substituted for another symbol.

Currently, in order to address symbol substitutions, state transition probabilities for each of the symbols are determined offline (e.g., in a laboratory setting). The state transition probabilities are provided to a decoder and used during low-density parity-check (LDPC) decoding. However, because the state transition probabilities are statistical averages and are generated offline, the state transition probabilities fail to account for any modifications or changes that may occur to the DNA-based storage system and/or the DNA sequences themselves during online DNA generation, storage and/or sequencing. Accordingly, it would be beneficial for DNA-based storage systems to update or otherwise re-estimate the state transition probabilities during a decoding operation in order to increase the efficiency and the reliability of its decoders.

SUMMARY

The present application describes systems and methods for updating initial state transition probabilities associated with an underlying memory error model utilized by a decoding system of a DNA-based storage system. In an example, the decoding system may utilize the initial state transition probabilities to perform a threshold number of decoding iterations. However, once, the threshold number of decoding iterations have been performed, the decoding operation may be stopped, interrupted or paused to enable the state transition probabilities to be updated. Once the state transition probabilities have been updated, the decoding operations may commence using the updated state transition probabilities. Although the initial state transition probabilities are generated in an offline environment, the updates to the state transition probabilities are performed in real time, substantially real time and/or during a runtime and/or execution of a decoding process on a particular DNA codeword in an online environment. Such updates increase an efficiency of LDPC decoders utilized by the DNA-based storage system.

Accordingly, the present application describes a method for updating state transition probabilities of a memory error model associated with a DNA-based storage system. In an example, the method includes performing at least one decoding iteration of a decoding process on a DNA codeword using a set of initial state transition probabilities. The decoding process is interrupted after the at least one decoding iteration has been executed. Decoding information obtained during the at least one decoding iteration is identified. At least one initial state transition probability of the set of initial state transition probabilities is then updated based, at least in part, on the decoding information.

The present application also describes a DNA-based storage system. In an example, the DNA-based storage system includes a decoding system and a control system. The control system causes the decoding system to perform a decoding process on a DNA codeword using a set of initial state transition probabilities. The control system also causes the decoding system to interrupt the decoding process based, at least in part, on a determination that a threshold number of decoding iterations of the decoding process have been executed. The control system also identifies decoding information that is obtained during the execution of the threshold number of decoding iterations. The control system may also update at least one initial state transition probability of the set of initial state transition probabilities based, at least in part, on the decoding information.

Also described is a control system for a DNA-based storage system. In an example, the control system includes means for causing a decoding system associated with the DNA-based storage system to perform a decoding process on a DNA codeword using a set of initial state transition probabilities. The control system also includes means for causing the decoding system to interrupt the decoding process based, at least in part, on determining that a threshold number of decoding iterations of the decoding process have been executed. The control system also includes means for identifying decoding information obtained during the execution of the threshold number of decoding iterations. The control system also includes means for updating at least one initial state transition probability of the set of initial state transition probabilities based, at least in part, on the decoding information. The control system also includes means for causing the decoding system to resume the decoding process using the updated at least one initial state transition probability.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of an entirely hardware implementation, an entirely software based implementation, or an implementation combining software and hardware aspects. The following detailed description is therefore not to be taken in a limiting sense, and the scope of the present disclosure is defined by the appended claims and their equivalents.

As indicated above, DNA-based storage systems are emerging as a promising storage technology. However, DNA-based storage systems are more prone to errors when compared to traditional electronic data storage systems. For example, during synthesis (e.g., writing), storage and/or sequencing (e.g., reading), one or more symbols in the DNA sequence may be substituted for another symbol. For example, one nucleotide base (e.g., the nucleotide base C) in a DNA sequence may be substituted for another nucleotide base (e.g., the nucleotide base T) in the DNA sequence.

In most cases, symbol substitution in a DNA sequence is asymmetric. For example, transitions between the nucleotide bases C and T occur more often than transitions between the nucleotide bases G and A. Following this logic, in current applications, state transition probabilities for DNA codewords are generalized and remain static throughout an entire decoding process.

For example, the state transition probabilities are measured in an offline environment (e.g., in a laboratory) and are simply statistical averages that relate to various conditions that may be shown by a large number of samples. However, these initial state transition probabilities fail to account for any modifications or changes that may occur to the DNA-based storage system and/or a particular DNA codeword or DNA sequence during online DNA generation, storage and/or sequencing. Any modifications or changes experienced by the DNA sequence or DNA codeword during generation, storage and/or sequencing are not reflected in the initial state transition probabilities. If the above-mentioned changes are not addressed by an error correction system and/or a decoding system of the DNA-based storage system, the performance of the decoding system and/or the error correction system will be negatively affected and the reliability of the DNA-based storage medium will be reduced.

In order to address the above, the present application describes a DNA-based storage system that updates initial state transition probabilities (and/or the underlying memory error model associated with the initial state transition probabilities) during a DNA codeword decoding process. Thus, although the initial state transition probabilities are generated in an offline environment, the updates to the state transition probabilities are performed in real time, substantially real time and/or during run time and/or execution of a decoding process on a particular DNA codeword in an online environment. Such updates increase an efficiency of LDPC decoders utilized by the DNA-based storage system. For example, during the DNA codeword decoding process, the initial state transition probabilities may be used by a low-density parity-check (LDPC) code of a decoding system of the DNA-based storage system to correct (or try to correct) one or more substitution errors. This may occur for X number of decoding iterations (where X is greater than or equal to one).

Once the number of iterations has passed the threshold, the initial state transition probabilities may be calibrated or otherwise updated based, at least in part, on information obtained during the decoding process. The information obtained during the decoding process may include which DNA symbol is the most likely symbol for a particular position in DNA sequence or DNA codeword. The updated state transition probabilities may then be used for subsequent decoding iterations on that particular DNA sequence or DNA codeword.

Accordingly, the present application includes many technical benefits including improving the correction capabilities of DNA-based storage systems by increasing the efficiency and accuracy of DNA-based storage system decoders. As the correction capabilities of DNA-based storage systems increases, DNA-based storage systems will be able to store longer DNA strings which in turn, enables greater storage density.

These and other examples will be described in more detail below with respect to FIG. 1-FIG. 5.

Figure 1:
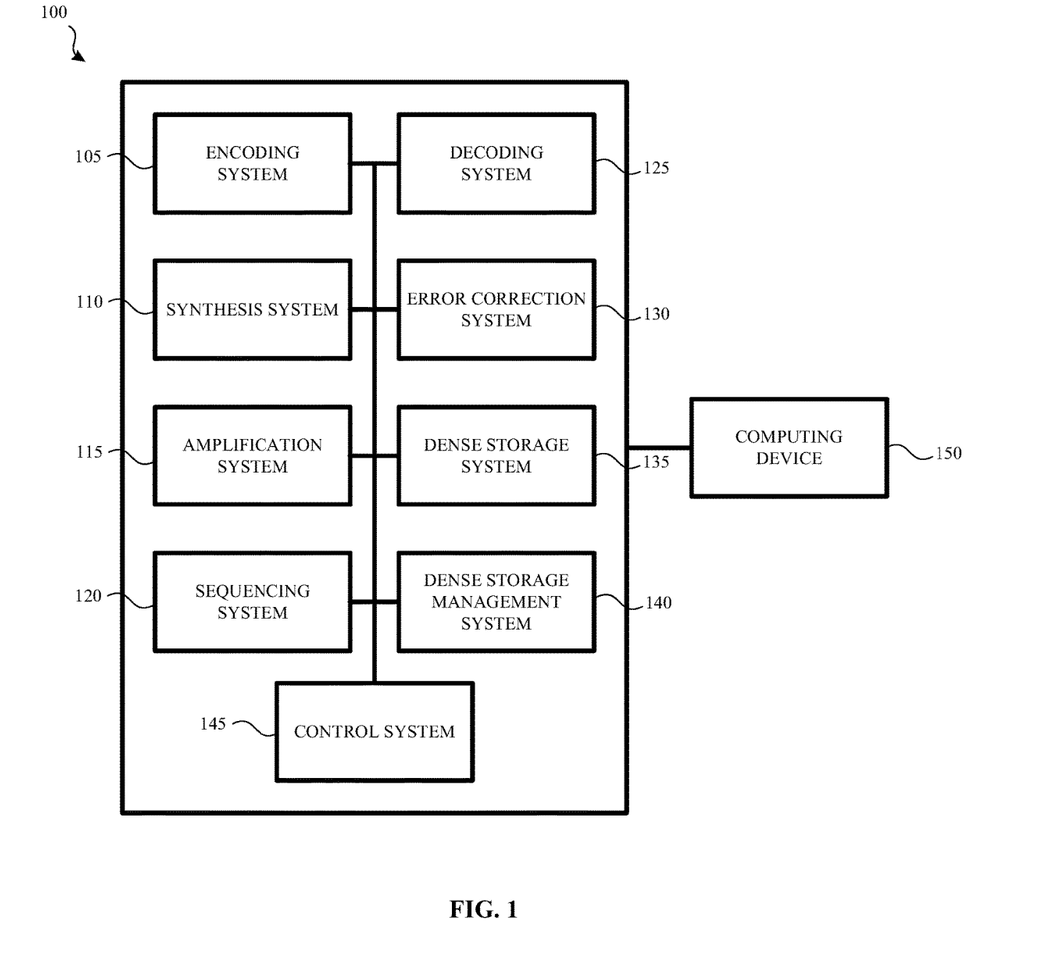
FIG. 1 illustrates a DNA-based storage system according to an example.

FIG. 1 illustrates a data storage system 100 according to an example. The data storage system 100 may be used to store data that is "more dense" when compared to data that is stored in a traditional electronic storage medium such as, for example, hard disks, optical disks, flash memory, and the like. For example, the data storage system 100 may be used to store synthetic DNA-based data. As such, the data storage system 100 may be referred to a DNA-based storage system.

DNA includes four naturally occurring nucleotide bases: adenine (A), cytosine (C), thymine (T) and guanine (G). In order to store data in synthetic DNA, received data is encoded to the various nucleotide bases. For example, data received as ones and zeros is encoded or otherwise mapped to various sequences of the synthetic DNA nucleotide bases. Once encoded, the data may be synthesized (e.g., written) and stored (e.g., in a dense storage system). To retrieve the stored data, the synthetic DNA molecules are sequenced (read) and subsequently decoded. As part of the decoding process, the synthetic DNA nucleotide bases are remapped to the original ones and zeros. Each of these processes will be described in greater detail below.

Although synthetic DNA-based data and associated DNA-based storage systems are specifically mentioned, the systems and methods described herein may be applicable to traditional electronic storage mediums/systems and/or traditional digital/binary data.

In an example, the data storage system 100 includes an encoding system 105. The encoding system 105 receives digital/binary information and/or data (e.g., ones and zeros) from a computing device (e.g., computing device 150) or from another source. When the data is received, the encoding system 105 converts or maps the ones and zeros of the original data into various DNA sequences using the synthetic DNA nucleotide bases ACTG. For example, the DNA nucleotide base "A" may be assigned a value 00, the DNA nucleotide base "C" may be assigned a value 01, the DNA nucleotide base "T" may be assigned a value 10 and the DNA nucleotide base "G" may be assigned a value 11.

Using this encoding scheme, digital data of 010010110100 can be represented as a DNA sequence or DNA string of CATGCA. Although specific values for each of the DNA nucleotide bases are given, each nucleotide base may be assigned any value. Additionally, although a specific encoding scheme is discussed, any encoding scheme may be used by the encoding system 105.

The data storage system 100 may also include a synthesis system 110. In an example, the synthesis system 110 writes or otherwise manufactures DNA strands based on the data provided by the encoding system 105. For example, using a series of chemical steps or processes, the various DNA bases (e.g., the ACTG bases determined in the encoding process) are assembled to mirror the encoded data. Although chemical steps or processes are mentioned, the synthesis system 110 may use other synthesis techniques.

Continuing with the example above, since the digital data of 010010110100 is represented as CATGCA, the synthesis system 110 would first generate and/or identify a "C" base. An "A" base would then be generated and/or identified and be attached to the "C" base. A "T" base would then be generated and/or identified and be attached to the "CA" combination that was previously generated. This process repeats until the entire DNA sequence (e.g., CATGCA) is generated.

When the synthesis process is complete, the DNA sequence is stored in a physical storage medium such as, for example, a dense storage system 135. The dense storage system 135 enables the synthesized DNA sequence to be stored and subsequently accessed. In an example, any storage medium capable of storing DNA-based data may be used as the dense storage system 135.

Once the DNA sequence has been stored, it may be subsequently accessed and prepared for sequencing (e.g., being read). As part of the preparation process, multiple copies of the DNA sequence may be generated. In an example, an amplification system 115 of the data storage system 100 may ensure that multiple copies of the DNA data are generated.

A sequencing system 120 may then be used to read DNA sequences from the dense storage system 135. In an example, the sequencing system 120 determines and/or identifies an order of the DNA symbols (e.g., ACTG) in a DNA segment of a DNA sequence that is being read. The sequencing system 120 may use a variety of sequencing methods such as, for example, sequencing by synthesis, nanopore sequencing, and the like.

For example, in nanopore sequencing, a DNA codeword is read by monitoring small changes in an ionic current flowing through a nanopore and determining a dwell time in a particular nanopore. Hard estimations for a particular DNA symbol in the DNA codeword are then made based on the ionic current and the dwell time.

Once the DNA sequence has been read, a decoding system 125 maps the DNA symbols back to digital data. For example, if the decoding system 125 receives CATGCA as the DNA sequence or DNA codeword, the decoding process performed by the decoding system 125 would return 010010110100 to a requesting computing device (e.g., computing device 150). In an example, the decoding system 125 may utilize one or more low-density parity-check (LDPC) codes during a decoding process.

As described above, errors may occur during the synthesis process, the storage process and/or the sequencing process. These errors may be insertion and deletion (indel) errors and/or substitution errors. For example, during a synthesis process in which the DNA sequence CATGCA is being synthesized, one or more symbols may be deleted or lost. As a result, a DNA sequence CTGCA may be stored by the dense storage system 135. In another example, during a synthesis process in which the DNA sequence CATGCA is being synthesized, an additional symbol may be added. As a result, a DNA sequence CCATGCA may be stored by the dense storage system 135. Although a single insertion error and a single deletion error are discussed, multiple deletions and/or insertions may occur in a synthesis process. Additionally, these errors may occur during storage and/or during a sequencing process.

In yet another example, during a synthesis process in which the DNA sequence CATGCA is being synthesized, the synthesis system 110 may substitute one symbol for another. As a result, a DNA sequence TATGCA may be stored in the dense storage system 135 instead of the DNA sequence CATGCA. In an example, multiple substitution errors (along with one or more indel errors) may occur during the synthesis process, during storage and/or during a sequencing process.

Figure 2A:
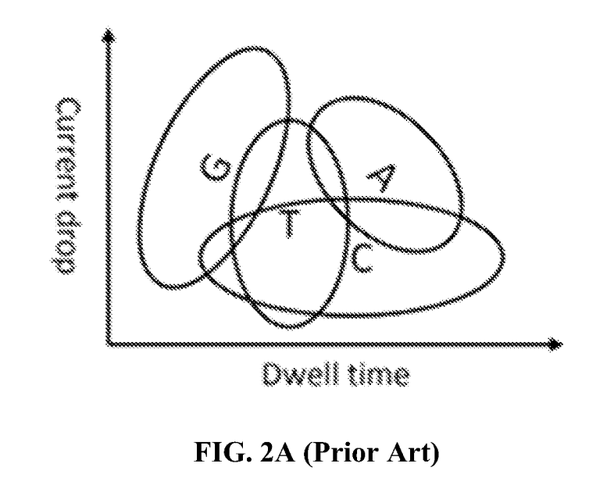
FIG. 2A illustrates how DNA symbol substitution may be asymmetric during a DNA sequencing process according to an example.

Nanopore sequencing may be particularly susceptible to substitution errors. For example and referring to FIG. 2A, in a nanopore sequencing process, DNA symbol substation may be asymmetric. For example, DNA symbol substitution may occur between C and T. T and G, or T and A. However, based on the information in FIG. 2A, substitutions between C and T are more likely when compared to substitutions between T and G and/or substitutions between T and A. Likewise, symbol substitutions may occur between C and G or C and A. However, DNA symbol substitutions between C and A are more likely when compared to DNA symbol substitutions between C and G. As shown in FIG. 2A, DNA symbol substitutions between A and G are less likely than the other DNA symbol substitutions.

Figure 2B:
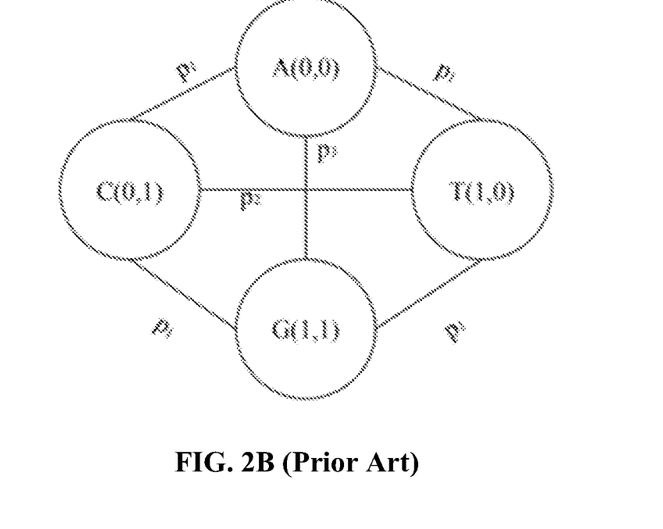
FIG. 2B illustrates a graph that shows how initial state transition probabilities are generated based, at least in part, on the symbol substitution information provided in FIG. 2A according to an example.

One DNA symbol being substituted for another DNA symbol may be based on a probability. As such, DNA symbol substitutions are referred to herein as state transitions or state transition probabilities. The state transition probabilities may be generalized such as shown in FIG. 2B. For example, FIG. 2B illustrates a graph that shows how initial state transition probabilities are generated based, at least in part, on the symbol substitution information provided in FIG. 2A according to an example. In the example shown, the state transition probabilities between the various DNA symbols may be represented as $\rho_1$, $\rho_2$ and $\rho_3$ where $\rho_3 \ll \rho_1 < \rho_2$.

As briefly described above, some DNA sequencing processes may be susceptible to substitution errors. As such, an error correction system 130 of the data storage system 100 may be configured to address these errors such as will be described in more detail below.

In an example, the error correction system 130 may be part of the decoding system 125. In another example, the error correction system 130 may be a standalone system. In either example, the error correction system 130 and the decoding system 125 may work in conjunction to resolve any errors of a particular DNA codeword during a decoding process.

For example, during a decoding process, the error correction system 130 may use initial state transition probabilities to address various substitution errors. However, as explained above, the initial state transition probabilities are generated offline and may fail to account for any modifications or changes that may occur to the data storage system 100 and/or the DNA sequences or DNA codewords during sequencing. As such, the error correction system 130 may update the initial state transition probabilities based, at least in part, on information obtained or determined during various iterations of a decoding process.

For example, once a number of decoding iterations has passed a threshold, an average DNA symbol transition value (or a determination of the DNA symbol itself) of the various DNA symbols that were read from each channel is determined. The average is then used to update the initial state transition probabilities such as will be described in greater detail below. The updated state transition probabilities may then be used for subsequent decoding iterations executed by the decoding system 125. In an example, updating state transition probabilities may occur a single time during a decoding process or multiple times during a decoding process.

As explained above, the decoding system 125 may use LDPC codes as part of its decoding scheme. The LDPC codes may be binary LDPC codes or non-binary LDPC codes. Both binary LDPC codes and non-binary LDPC codes may be implemented in the log likelihood (LLR) domain. In general, a LLR in the binary domain is defined as the log of the probability of an ith bit being a logic 0 value divided by the probability of the ith bit being a logic 1 value. In the non-binary domain, the LLR may be a probability of whether a given symbol is equal to a certain value divided by the probability of whether a given symbol is not equal to this value.

In the examples that follow, a LLR may be referred to as an a priori LLR (referred to as a priori LLR P) and an a posteriori LLR (referred to as a posteriori LLR Q). A priori LLRs P provide an initial set of LLR values for the symbols of the DNA codeword during a decoding process. For example, a priori LLR values are initial LLR estimates. If a priori LLRs P do not initially result in a successful decoding process, the error correction system 130 may cause one or more of the a priori LLR values to be updated during the decoding process. LLR values that are generated and/or updated during the decoding process are referred to as a posteriori LLRs Q. Changes to the a priori LLRs P during the decoding process are indicated by a set of a posteriori LLRs Q.

In some examples, before a decoding process is performed, an initial set of a priori LLRs $P^{init}$ is determined for each symbol in a DNA codeword. As will be described in greater detail below, the initial set of a priori LLRs $P^{init}$ may be updated to form a new set of a priori LLRs $P^{new}$. This process may be repeated for each symbol in the DNA codeword.

For example, in a non-binary implementation, an initial a priori LLR $P^{init}$ may be initialized using the following equation: $P_v(a) = -\ln(\Pr(x_v = a | \text{channel}))$ where "a" is each of the possible four values (e.g., DNA symbols ACTG) of $x_v$. That is, $P_v$ may equal [a0, a1, a2, a3] (a vector of some 4 values).

Additionally, each a priori LLR $P^{init}$ may be associated with a reliability bin r. As discussed above, in DNA coding, there are four different symbols (ACTG). In non-binary LDPC decoding, there are overall sixteen different state transitions. The state transitions are from an initially read state to a current estimation probability that the DNA symbol is in the corresponding state. As such, the reliability bins r are defined as different state transitions (e.g., A to A, A to G, A to C, etc.).

Figure 3:
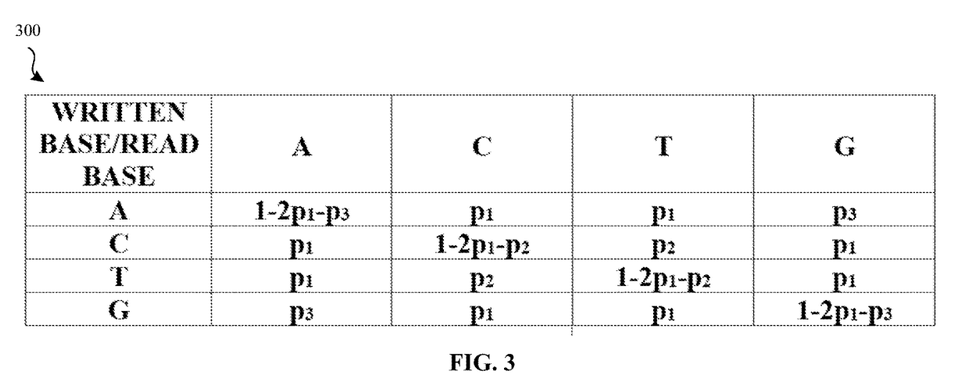
FIG. 3 illustrates a table that represents reliability bins of a memory error model in which each reliability bin is associated with an initial state transition probability according to an example.

An initial set of reliability bins are shown in FIG. 3. For example, FIG. 3 illustrates a table 300 that represents reliability bins of a memory error model in which each reliability bin is associated with an initial state transition probability. In this example, the probability of each of the reliability bins (e.g., reliability bin r 300) is based on the probabilities shown and described with respect to FIG. 2B. Additionally, the rows represent the DNA symbols that were read from a particular channel and the columns represent the probability to switch to a corresponding DNA symbol. In an example, a number value of each probability in a given row should equal one.

In an example, each reliability bin r 300 may be associated with a particular a priori LLR $P^{init}$. Additionally, each reliability bin r 300 may be associated with a bit error rate (BER) of an underlying memory error model. In the examples herein, the probabilities in each reliability bin r 300 may be considered the BER. As such, in order to determine the initial LLR of each reliability bin r 300, the following equation may be used:

$$|LLR_r| = \log \frac{1 - BER_r}{BER_r}$$

Once the initial a priori LLRs $P^{init}$ are determined, the initial a priori LLRs $P^{init}$ are used to perform a decoding process. For example, the decoding process may be a process in which a determination is made as to whether all of the DNA symbols in a DNA codeword are correct. If not, the error correction system 130 and/or the decoding system 125 may determine which DNA symbols have been substituted for other DNA symbols based, at least in part, on the a priori LLRs $P^{init}$.

If the error correction system 130 and/or the decoding system 125 determines that the decoding process is complete, the decoded DNA codeword may be provided to a requesting computing device 150. However, if the DNA codeword has not been successfully decoded after a threshold number of times, the decoding system 125 and/or the error correction system 130 may determine that at least one DNA symbol is incorrect. The decoding system 125 and/or the error correction system 130 may also determine which DNA symbols should be changed.

In an example, the determination regarding which DNA symbol to change is based on the a priori LLRs $P^{init}$. For example, in one example decoding scheme, the lower the probability that a particular DNA symbol was flipped, the higher reliability of the DNA symbol. Conversely, the higher the probability that the particular DNA symbol was flipped, the lower reliability of the DNA symbol.

At the start of a decoding process (and presuming there are substitution errors in a given DNA codeword), the error correction system 130 and/or the decoding system 125 may access the initial a priori LLRs $P^{init}$. The initial a prior LLRs $P^{init}$ may be used for a threshold number of iterations of the decoding process. However, once the threshold number of iterations have been executed, a determination may be made as to whether the DNA codeword has been successfully decoded. If not, the initial set of a priori LLRs $P^{init}$ (e.g. in a changed and/or updated state) are made equivalent to a set of a posteriori LLRs Q.

For example, instead of just calculating the initial set of a priori LLRs $P^{init}$ and performing a single, continuous decoding process based on the initial set of a priori LLRs $P^{init}$, a positive feedback decoding process is implemented by the error correction system 130 and/or the decoding system 125. During the positive feedback decoding process, the error correction system 130 and/or the decoding system 125 obtain information corresponding to the decoding iterations that were performed (presuming the decoding process has not been completed). The information is reflected in a current set of a posteriori LLRs $Q^{cur}$ generated during the completed decoding iterations. The a posteriori LLRs $Q^{cur}$ are used to update or improve the BER (or the reliability characteristics) of the underlying memory error model. This information is subsequently used to generate a new/updated set of a priori LLRs $P^{new}$ and a new/updated set of a posteriori LLRs $Q^{new}$.

The new/updated set of posteriori LLRs $Q^{new}$ is then used for subsequent iterations of the decoding process. In some examples, calculating new and/or updated a posteriori LLRs $Q^{new}$ and using those values during subsequent portions of the decoding process may cause the decoding system 125 to operate more efficiently. In some examples, generation of new and/or updated sets of a priori LLRs $P^{new}$ and a posteriori LLRs $Q^{new}$ may be performed a single time or multiple times during a decoding process.

For example, the error correction system 130, a control system 145 and/or other subsystems of the data storage system 100, may monitor a number of decoding iterations performed by the decoding system 125 during a DNA codeword decoding process. The error correction system 130 or the control system 145 may pause, interrupt, or stop the decoding process once a threshold number of iterations have been performed (e.g., using the initial set of a priori LLRs $P^{init}$). Although a threshold number of iterations is specifically mentioned, other criteria may be used. For example, the error correction system may determine that the decoding process is stuck or not progressing at a fast enough rate.

In another example, the error correction system 130 and/or the control system 145 may update the underlying memory error model based on current decoding conditions. For example, the length of a particular DNA sequence or DNA codeword may be correlated to the error rate (e.g., later sections of a DNA sequence of DNA codeword may have higher BERs). As such, the error correction system 130 may determine that the decoding process has reached a particular location of a DNA sequence or DNA codeword and update LLRs more frequently based on this information.

Once the decoding process has been interrupted, stopped or paused, a posteriori LLRs Q in their current state are referred to herein as current a posteriori LLRs $Q^{cur}$. Additionally, new and/or updated a priori LLRs $P^{new}$ and a posteriori LLRs $Q^{new}$ may be calculated. For example, the current a posteriori LLRs $Q^{cur}$ may be used to calculate updated reliability characteristic values for each symbol of the DNA codeword based, at least in part, on the current a posteriori LLRs $Q^{cur}$. In an example, the reliability characteristic values are updated compared to the initial reliability characteristic values defining the initial memory error model upon which the initial a priori LLR values $P^{init}$ are based.

For example, updating the reliability characteristic values refines the initial memory error model for a particular DNA codeword. As discussed above, the reliability characteristic of the memory model may be a BER. In some examples, updating the BER for a particular DNA symbol in a DNA codeword may be performed using the following equation (assuming that log base two LLRs are used as the reliability metric):

$$BER_i = \begin{cases} \dfrac{2^{-|Q_i^{cur}|}}{1+2^{-|Q_i^{cur}|}}, & \text{if } \operatorname{sign}(Q_i^{cur}) = HB_i \\ \dfrac{1}{1+2^{-|Q_i^{cur}|}}, & \text{if } \operatorname{sign}(Q_i^{cur}) \neq HB_i \end{cases}$$

In the equation above, $BER_i$ represents an ith probability estimation for an ith DNA symbol of the DNA codeword, $|Q_i^{cur}|$ represents the probability of the ith current a posteriori LLR $Q_i^{cur}$, $HB_i$ represents the hard bit value of the ith DNA symbol.

Once the estimated bit error rates have been determined, the estimated bit error rates may be used to adjust the probabilities in one or more of the reliability bins r 300. In some examples, one or more reliability bins r 300 may be adjusted.

The estimated bit error rates may then be used to calculate average or expected, estimated bit error rates $BER_r = E_{i \in r}[BER_i]$ for each reliability bin r 300. The average or estimated BER values may then be used to determine new and/or updated a priori LLRs according to the following mathematical equation:

$$P_{i \in r}^{new} = (1 - 2HB_i)\log_2 \frac{1 - BER_r}{BER_r}$$

In the equation above. $P_i^{new}$ represents a new or updated a priori LLR for an ith DNA symbol, $HB_i$ is the hard bit logic value of the ith DNA symbol, and $BER_r$ is the average or estimated BER of reliability bin r 300. Additionally, the term "$i \in r$" is used to denote that the average or estimated BER that is used or otherwise associated with the reliability bin with which the ith DNA symbol is associated. In some examples, the estimated BER may be updated in the table 300 shown in FIG. 3.

Once new a priori LLRs $P^{new}$ for the DNA codeword have been generated, these values may be used to calculate or otherwise determine new and/or updated a posteriori LLRs $Q^{new}$ according to the following mathematical equation:

$$Q_i^{new} = Q_i^{cur} - P_i^{old} P_i^{new}$$

In the equation above. $Q_i^{new}$ represents the new and/or updated a posteriori LLR for the ith DNA symbol, $Q_i^{cur}$ represents the current a posteriori LLR for the ith DNA symbol when the decoding process was interrupted, stopped or paused, $P_i^{new}$ represents the new and/or updated a priori LLR for the ith DNA symbol, and $P_i^{old}$ represents the old a priori LLR for the ith DNA symbol. In an example, during an initial update process (e.g., an update process that is performed after the decoding process is interrupted, stopped or paused for the first time), the old a priori LLRs $P^{old}$ may be set to the initial a priori LLRs $P^{init}$. For any subsequent update processes, the old a priori LLRs $P^{old}$ may be set to the last "new" a priori LLRs determined in the prior update process.

Once the new a posteriori LLRs $Q^{new}$ have been determined, the error correction system 130 may cause the decoding process to resume. In response, the decoding system may use the new a posteriori LLRs $Q^{new}$ in subsequent decoding iterations. Additional details about updating LLR values and associated BERs are further described in U.S. Pat. No. 10,554,227, entitled Decoding Optimization for Channel Mismatch, by Sharon et al., the entire disclosure of which is hereby incorporated by reference in its entirety.

The data storage system 100 may also include a dense storage management system 140. In an example, the dense storage management system 140 controls the various operations and/or processes that are carried out by and/or on the dense storage system 135. The operations and/or processes may include the mechanics of storage and retrieval of the DNA data and/or information storage management (e.g., making copies of data, deleting data, selecting subsets of the data, etc.). The dense storage management system 100 may also store the various LLR values described above.

The data storage system 100 may also include a control system 145. The control system 145 may include at least one processor, at least one controller and/or other such control circuitry. The control system 145 may include circuitry for executing instructions from the computing device 150 (or from another source) and/or providing instructions to the various subsystems of the data storage system 100. The control system may also cause the error correction system 130 and/or the decoding system 125 to interrupt, pause or stop a decoding process in order to update the various LLR values described above.

In an example, the data storage system 100 may be associated with or otherwise be communicatively coupled to a computing device 150. The computing device 150 may, via a communication channel, provide data and/or instructions to the data storage system 100. The computing device 150 may also receive data from the data storage device 100 via the communication channel. Although FIG. 1 shows the data storage system 100 being separate from the computing device 150, the data storage system 100, and/or one or more subsystems of the data storage system 100, may be integrated with the computing device 150.

Figure 4:
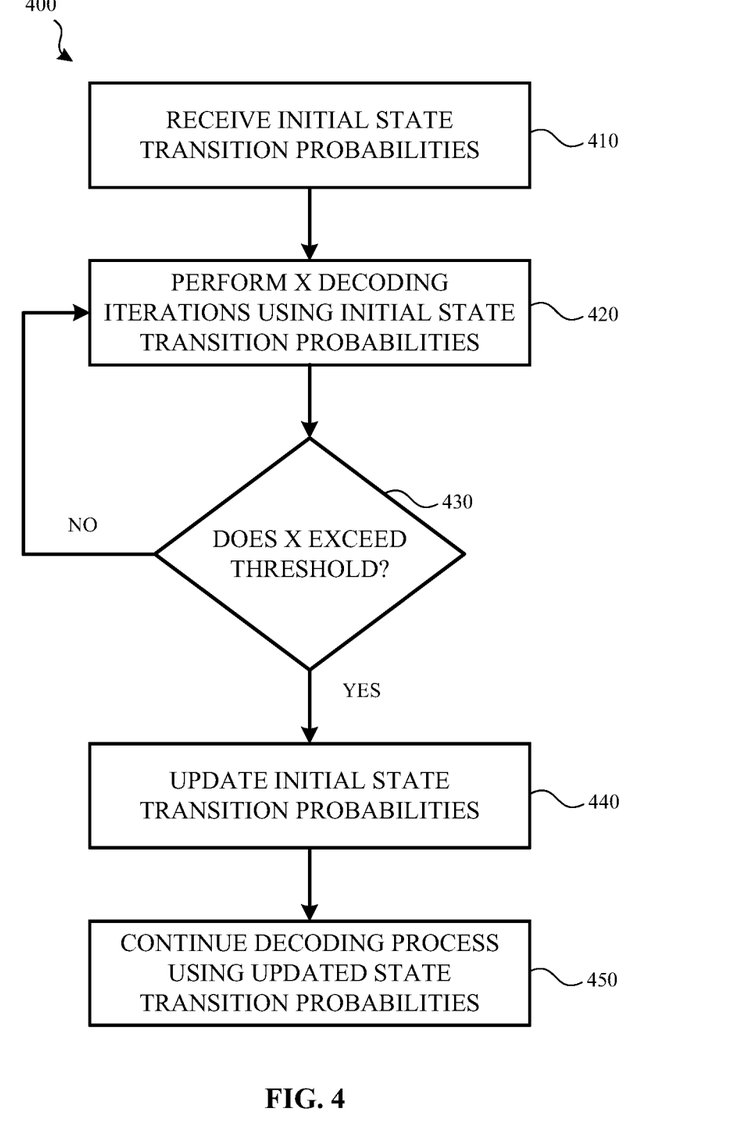
FIG. 4 illustrates a method for updating initial state transition probabilities according to an example.

FIG. 4 illustrates a method 400 for decoding a DNA codeword based, at least in part, on initial and/or updated state transition probabilities according to an example. The method 400, or portions thereof, may be performed by a data storage system (e.g., data storage system 100 (FIG. 1)) and/or one or more subsystems of the data storage system.

The decoding method may begin when initial state transition probabilities for a DNA codeword are received (410) or are otherwise accessed. In an example, the state transition probabilities may be received or otherwise accessed by a decoding system and/or an error correction system of the data storage system. In an example, the state transition probabilities may be received and/or accessed by the decoding system in response to DNA sequencing process performed by a sequencing system in which a DNA codeword is read or otherwise received from a dense storage system.

Once the DNA codeword is received or otherwise read, X decoding iterations of a decoding process are performed (420) on the DNA codeword by the decoding system. In an example, X is greater than or equal to one. Additionally, each decoding iteration may use the initial state transition probabilities in an attempt to correct one or more substitution errors present in the DNA codeword.

During the decoding process, a determination (430) is made as to whether X exceeds a threshold. For example, the decoding system may determine whether X is greater than or equal to a decoding iteration threshold. If the decoding iteration threshold has not been met or exceeded, the decoding system may continue to perform decoding operations using the initial state transition probabilities.

However, if it is determined (430) that X exceeds the decoding iteration threshold, the decoding system may update the initial state transition probabilities. In an example, the update process may be used to generate a set of new or updated a priori LLRs $P^{new}$ and/or a posteriori LLRs $Q^{new}$ such as described above.

Once the initial state transition probabilities have been updated, the decoding process may continue (450) using the updated state transition probabilities. In an example, method 400, or portions of method 400 may be performed many times during a decoding process. It is also contemplated, that portions of method 400 may be performed many times based on, for example, current decoding conditions. As explained above, the decoding conditions may include the length of particular DNA codeword and/or a particular location of the DNA codeword that is currently being decoded.

Figure 5:
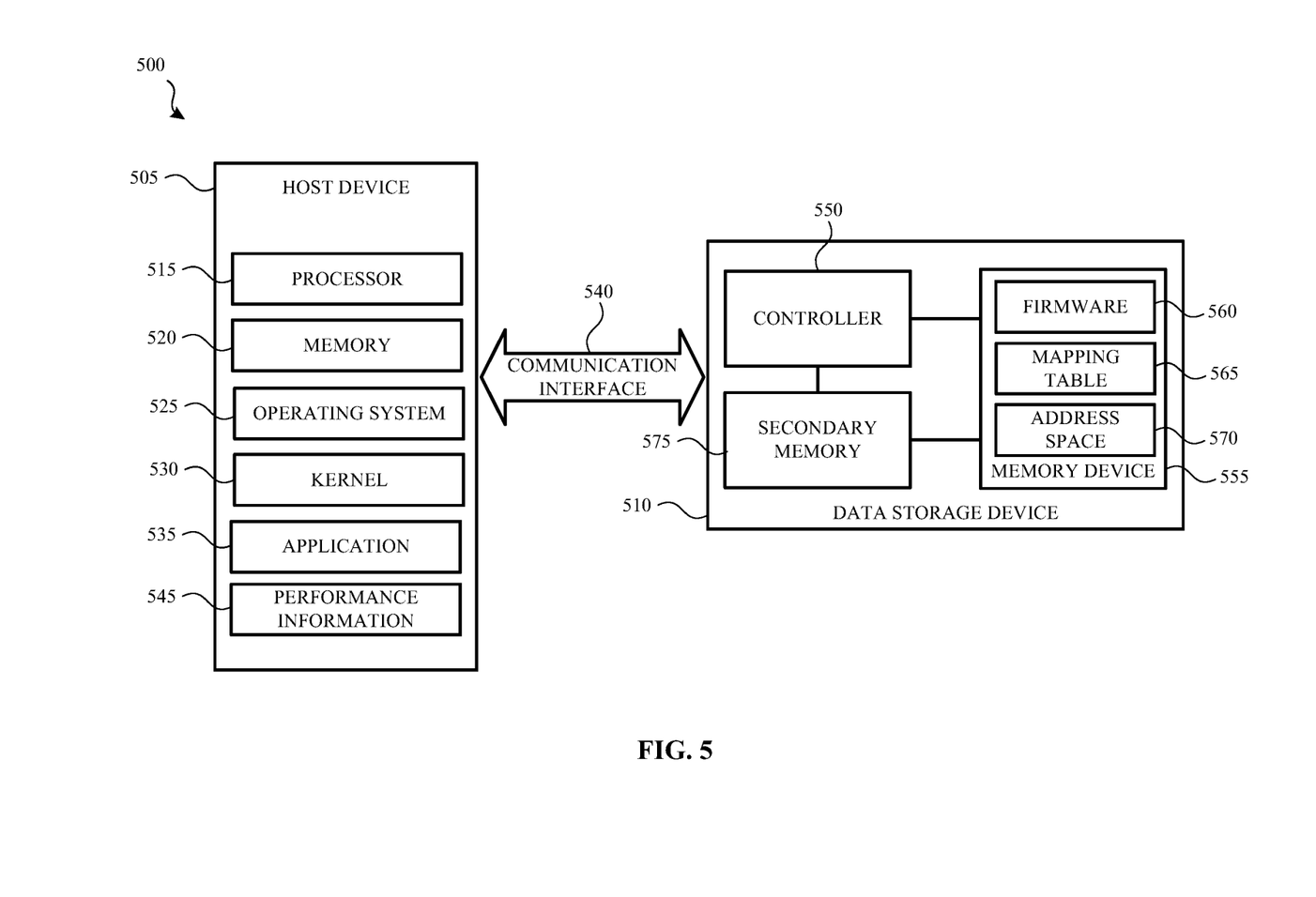
FIG. 5 illustrates a block diagram of a system that may be associated with or otherwise utilize various subsystems of the DNA-based storage system of FIG. 1 according to an example.

FIG. 5 is a block diagram of a system 500 that includes a host device 505 and a data storage device 510 according to an example. In an example, the host device 505 may be similar to the computing device 150 shown and described with respect to FIG. 1. The host device 505 includes a processor 515 and a memory device 520 (e.g., main memory). The memory device 520 may include an operating system 525, a kernel 530 and/or an application 535.

The processor 515 can execute various instructions, such as, for example, instructions from the operating system 525 and/or the application 535. The processor 515 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 515 may include a System on a Chip (SoC).

In an example, the memory device 520 can be used by the host device 505 to store data used by the processor 515. Data stored in the memory device 520 may include instructions provided by the data storage device 510 via a communication interface 540. The data stored in the memory device 520 may also include data used to execute instructions from the operating system 525 and/or one or more applications 535. In an example, the memory 520 is volatile memory, such as, for example, Dynamic Random Access Memory (DRAM).

In an example, the operating system 525 may create a virtual address space for the application 535 and/or other processes executed by the processor 515. The virtual address space may map to locations in the memory device 520. The operating system 525 may include or otherwise be associated with a kernel 530. The kernel 530 may include instructions for managing various resources of the host device 505 (e.g., memory allocation), handling read and write requests and so on.

The communication interface 540 communicatively couples the host device 505 and the data storage device 510. The communication interface 540 may be a Serial Advanced Technology Attachment (SATA), a PCI express (PCIe) bus, a Small Computer System Interface (SCSI), a Serial Attached SCSI (SAS), Ethernet, Fibre Channel, or WiFi. As such, the host device 505 and the data storage device 510 need not be physically co-located and may communicate over a network such as a Local Area Network (LAN) or a Wide Area Network (WAN), such as the internet. In addition, the host device 505 may interface with the data storage device 510 using a logical interface specification such as Non-Volatile Memory express (NVMe) or Advanced Host Controller Interface (AHCI).

The data storage device 510 includes a controller 550 and a memory device 555 (e.g. volatile and/or non-volatile memory). The memory device 555 (and/or portions of the memory device 555) may also be referred to as a storage medium. The memory device 555 includes a number of storage elements. In an example, each storage element is a chip or a memory die that is used to store data.

For example, the memory device 555 may include a first memory die and a second memory die. In an example, the first memory die and the second memory die include non-volatile memory elements such as, for example, NAND flash memory elements and/or NOR flash memory elements. Although two memory dies are mentioned, the memory device 555 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof.

The controller 550 may include circuitry for executing instructions. The instructions may originate from firmware 560 associated with the data storage device 510. In another example, the instructions may originate from the host device 505. Accordingly, the controller 550 may include circuitry such as one or more processors, a microcontroller, a DSP, an ASIC, an FPGA, hard-wired logic, analog circuitry and/or a combination thereof. In another example, the controller 550 may include a SoC.

The data storage device 510 may also include secondary memory 575. The secondary memory 575 may be a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 555 is capable of storing data at a byte-addressable level, as opposed to other types of non-volatile memory that have a smallest writable data size such as a page size of 4 KB or a sector size of 512 Bytes.

In some examples, the memory device 555 may also store a mapping table 565 and/or an address space 570. In some examples, the controller 550 can associate portions of data stored in the secondary memory 575 with unique identifiers. The unique identifiers may be stored in the memory device 555 and be used by the operating system 525 to access stored data. For example, the mapping table 565 can provide a mapping of unique identifiers with indications of physical locations (e.g., Physical Block Addresses (PBAs)) where the corresponding portions of data are stored in the memory device 555 and/or the secondary memory 575.

In some examples, the firmware 560 may store, maintain, be associated with or otherwise have access to a mapping table (e.g., mapping table 565) that stores and/or maintains mapping information for the various DNA sequences such as described above.

As briefly discussed above, the memory device 555 may also include address space 570. The address space 570 can serve as at least a portion of an address space used by the processor 515. In an example, the address space 570 can store data at a byte-addressable level that can be accessed by the processor 515 (e.g., via the communication interface 540).

For example, the data storage device 510 may provide the host device 505 with an indication of the address space 570. The host device 505 may then associate an address range for the address space 570 and an indication that this address range is to be used as a byte-addressable address space, such as for a page cache.

In another example, the host device 505 may manage the data storage device 510 such that the processor 515 can directly access address space 570. For example, the data storage device 510 may provide logical to physical address translation information to the host device 505, which can be called by the host device 505 and executed by the processor 515 and/or the controller 550. In some examples, the controller 550 may include or otherwise be associated with a flash translation layer (FTL). The FTL may map the logical block addresses to the physical addresses of the memory device 555.

Although FIG. 5 illustrates the host device 505 being separate from the data storage device 510, the host device 505 and the data storage device 510, as well the various components described, may be part of a single device or part of multiple devices.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 505 (FIG. 5)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Accordingly, and based on the above, examples of the present disclosure describe a method for updating state transition probabilities of a memory error model associated with a DNA-based storage system, comprising: performing at least one decoding iteration of a decoding process on a DNA codeword using a set of initial state transition probabilities; interrupting the decoding process after the at least one decoding iteration has been executed; identifying decoding information obtained during the at least one decoding iteration; and updating at least one initial state transition probability of the set of initial state transition probabilities based, at least in part, on the decoding information. In some examples, the method includes resuming the decoding process based, at least in part, on the updating of the at least one initial state transition probability. In some examples, the method includes interrupting the decoding process a second time during the decoding process based, at least in part, on a determined decoding condition. In some examples, the decoding condition is associated with a length of the DNA codeword. In some examples, each initial state transition probability of the set of initial state transition probabilities is associated with a reliability bin. In some examples, the set of initial state transition probabilities is generated in an offline environment and wherein the at least one initial state transition probability of the set of initial state transition probabilities is updated during runtime in an online environment. In some examples, each initial state transition probability of the set of initial state transition probabilities is associated with a respective log likelihood ratio (LLR). In some examples, updating the at least one initial state transition probability of the set of initial state transition probabilities comprises updating the respective LLR associated with the at least one initial state transition probability.

Other examples describe a DNA-based storage system, comprising: a decoding system; and a control system operable to: cause the decoding system to perform a decoding process on a DNA codeword using a set of initial state transition probabilities; cause the decoding system to interrupt the decoding process based, at least in part, on determining that a threshold number of decoding iterations of the decoding process have been executed; identify decoding information obtained during execution of the threshold number of decoding iterations; and update at least one initial state transition probability of the set of initial state transition probabilities based, at least in part, on the decoding information. In some examples, the control system is further operable to cause the decoding system to resume the decoding process based, at least in part, on a determination that the at least one initial state transition probability has been updated. In some examples, the control system is further operable to cause the decoding system to interrupt the decoding process a second time based, at least in part, on a determined decoding condition. In some examples, the decoding condition is associated with a length of the DNA codeword. In some examples, each initial state transition probability of the set of initial state transition probabilities is associated with a reliability bin. In some example, the set of initial state transition probabilities are generated in an offline environment and wherein the at least one initial state transition probability of the set of initial state transition probabilities is updated during runtime in an online environment. In some examples, each initial state transition probability of the set of initial state transition probabilities is associated with a respective log likelihood ratio (LLR). In some examples, updating the at least one initial state transition probability of the set of initial state transition probabilities comprises updating the respective LLR associated with the at least one initial state transition probability.

In yet other examples, the present application describes a control system for a DNA-based storage system, comprising: means for causing a decoding system associated with the DNA-based storage system to perform a decoding process on a DNA codeword using a set of initial state transition probabilities; means for causing the decoding system to interrupt the decoding process based, at least in part, on determining that a threshold number of decoding iterations of the decoding process have been executed; means for identify decoding information obtained during the execution of the threshold number of decoding iterations; means for updating at least one initial state transition probability of the set of initial state transition probabilities based, at least in part, on the decoding information; and means for causing the decoding system to resume the decoding process using the updated at least one initial state transition probability. In some examples, the decoding process is resumed based, at least in part, on a determination that the at least one initial state transition probability has been updated. In some examples, the control system includes means for causing the decoding system to interrupt the decoding process a second time based, at least in part, on a determined decoding condition. In some examples, each initial state transition probability of the set of initial state transition probabilities is associated with a respective log likelihood ratio (LLR).

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method for updating state transition probabilities of a memory error model associated with a deoxyribonucleic acid (DNA)-based storage system, the method comprising:
    performing at least one decoding iteration of a decoding process on a DNA codeword using a set of initial state transition probabilities, the decoding process mapping DNA symbols in the DNA codeword to corresponding bits;
    interrupting the decoding process after the at least one decoding iteration has been performed;
    identifying decoding information obtained during the at least one decoding iteration; and
    updating at least one initial state transition probability of the set of initial state transition probabilities based, at least in part, on the decoding information.

2. The method of claim 1, further comprising resuming the decoding process based, at least in part, on the updating of the at least one initial state transition probability.

3. The method of claim 1, further comprising interrupting the decoding process a second time during the decoding process based, at least in part, on a determined decoding condition.

4. The method of claim 3, wherein the decoding condition is associated with a length of the DNA codeword.

5. The method of claim 1, wherein each initial state transition probability of the set of initial state transition probabilities is associated with a reliability bin.

6. The method of claim 1, wherein the set of initial state transition probabilities is generated in an offline environment and wherein the at least one initial state transition probability of the set of initial state transition probabilities is updated during runtime in an online environment.

7. The method of claim 1, wherein each initial state transition probability of the set of initial state transition probabilities is associated with a respective log likelihood ratio (LLR).

8. The method of claim 7, wherein updating the at least one initial state transition probability of the set of initial state transition probabilities comprises updating the respective LLR associated with the at least one initial state transition probability.

9. A deoxyribonucleic acid (DNA)-based storage system, comprising:
    a decoding system; and
    a control system operable to:
        cause the decoding system to perform a decoding process on a DNA codeword using a set of initial state transition probabilities, the decoding process mapping DNA symbols in the DNA codeword to corresponding bits;
        cause the decoding system to interrupt the decoding process based, at least in part, on determining that a threshold number of decoding iterations of the decoding process has been executed;
        identify decoding information obtained during execution of the threshold number of decoding iterations; and
        update at least one initial state transition probability of the set of initial state transition probabilities based, at least in part, on the decoding information.

10. The DNA-based storage system of claim 9, wherein the control system is further operable to cause the decoding system to resume the decoding process based, at least in part, on a determination that the at least one initial state transition probability has been updated.

11. The DNA-based storage system of claim 9, wherein the control system is further operable to cause the decoding system to interrupt the decoding process a second time based, at least in part, on a determined decoding condition.

12. The DNA-based storage system of claim 11, wherein the decoding condition is associated with a length of the DNA codeword.

13. The DNA-based storage system of claim 9, wherein each initial state transition probability of the set of initial state transition probabilities is associated with a reliability bin.

14. The DNA-based storage system of claim 9, wherein the set of initial state transition probabilities is generated in an offline environment and wherein the at least one initial state transition probability of the set of initial state transition probabilities is updated during runtime in an online environment.

15. The DNA-based storage system of claim 9, wherein each initial state transition probability of the set of initial state transition probabilities is associated with a respective log likelihood ratio (LLR).

16. The DNA-based storage system of claim 15, wherein updating the at least one initial state transition probability of the set of initial state transition probabilities comprises updating the respective LLR associated with the at least one initial state transition probability.

17. A control system for a deoxyribonucleic acid (DNA)-based storage system, the control system comprising:
    means for causing a decoding system associated with the DNA-based storage system to perform a decoding process on a DNA codeword using a set of initial state transition probabilities, the decoding process mapping DNA symbols in the DNA codeword to corresponding bits;
    means for causing the decoding system to interrupt the decoding process based, at least in part, on determining that a threshold number of decoding iterations of the decoding process have has been executed;

means for identifying decoding information obtained during the execution of the threshold number of decoding iterations;

means for updating at least one initial state transition probability of the set of initial state transition probabilities based, at least in part, on the decoding information; and means for causing the decoding system to resume the decoding process using the updated at least one initial state transition probability.

18. The control system for the DNA-based storage system of claim 17, wherein the decoding process is resumed based, at least in part, on a determination that the at least one initial state transition probability has been updated.

19. The control system for the DNA-based storage system of claim 17, further comprising means for causing the decoding system to interrupt the decoding process a second time based, at least in part, on a determined decoding condition.

20. The control system for the DNA-based storage system of claim 17, wherein each initial state transition probability of the set of initial state transition probabilities is associated with a respective log likelihood ratio (LLR).

* * * * *